US011219216B2

(12) United States Patent
Lorenz et al.

(10) Patent No.: US 11,219,216 B2
(45) Date of Patent: Jan. 11, 2022

(54) METHOD OF IMPROVING TOLERANCE OF PLANTS TO HERBICIDES USING SEED INSECTICIDE TREATMENTS

(71) Applicant: THE BOARD OF TRUSTEES OF THE UNIVERSITY OF ARKANSAS, Little Rock, AR (US)

(72) Inventors: Gus Lorenz, Greenbrier, AR (US); Robert Scott, Lonoke, AR (US); Jarrod Hardke, Hazen, AR (US); Jason Norsworthy, West Fork, AR (US)

(73) Assignee: THE BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 15/090,218

(22) Filed: Apr. 4, 2016

(65) Prior Publication Data
US 2016/0286815 A1 Oct. 6, 2016

Related U.S. Application Data

(60) Provisional application No. 62/142,160, filed on Apr. 2, 2015.

(51) Int. Cl.
| *A01N 51/00* | (2006.01) |
| *A01N 25/32* | (2006.01) |
| *A01N 25/00* | (2006.01) |
| *A01P 13/00* | (2006.01) |
| *A01P 15/00* | (2006.01) |
| *A01N 57/20* | (2006.01) |
| *A01N 43/40* | (2006.01) |
| *A01N 43/86* | (2006.01) |
| *A01N 43/56* | (2006.01) |
| *A01N 43/60* | (2006.01) |

(52) U.S. Cl.
CPC ............. *A01N 51/00* (2013.01); *A01N 25/00* (2013.01); *A01N 25/32* (2013.01); *A01N 57/20* (2013.01); *A01P 13/00* (2021.08); *A01P 15/00* (2021.08); *A01N 43/40* (2013.01); *A01N 43/56* (2013.01); *A01N 43/60* (2013.01); *A01N 43/86* (2013.01)

(58) Field of Classification Search
CPC ........ A01N 51/00; A01N 25/00; A01N 25/32; A01N 43/40; A01N 43/86; A01N 43/56; A01N 43/60; A01N 57/26; A01N 57/20; A01P 13/00; A01P 15/00
See application file for complete search history.

(56) References Cited

U.S. PATENT DOCUMENTS

| 4,740,236 A | 4/1988 | Topfl |
| 2004/0023802 A1* | 2/2004 | Asrar ..................... A01N 51/00 504/100 |
| 2005/0266996 A1 | 12/2005 | Krause et al. |
| 2010/0137138 A1 | 6/2010 | Rosinger et al. |
| 2013/0225404 A1 | 8/2013 | Grimm |
| 2013/0338007 A1 | 12/2013 | Shen |

FOREIGN PATENT DOCUMENTS

| DE | 102011079991 A1 * | 9/2012 | ............. A01N 51/00 |
| WO | 2012059328 A3 | 5/2012 | |

OTHER PUBLICATIONS

Scott, R.C., Use of CruiserMaxx Rice Seed Treatment to Improve Tolerance of Conventional Rice to Newpath (Imazethapyr) and Roundup (Glyphosate) at Reduced Rates, 2013, AAES Research Series 617, Pest Management: Weeds, B.R. Wells Arkansas Rice Research Studies 2013, pp. 227-233.*
Gore, J., Foliar Sprays to Supplement Seed Treatments in Hybrid Rice, 2013, Rice2013, Mississippi Rice Promotion Board, pp. 1-20.*
Description DE102011079991, 2012, English Translation of DE102011079991, Patent Translate powered by EPO and Google, 50 pages. (Year: 2012).*
2012 University of Arkansas Rice Research Verification Program, 2012, U of A Division of Agriculture Research and Extension; University of Arkansas System, 15 pages. (Year: 2012).*
CruiserMaxx Rice Product Label, 2015, Syngenta, pp. 1-22 (Year: 2015).*
Bond, J. A., Mississippi State University, DREC Dermacor X-100 on Rice Variety and Rice Hybrid, 2008, Rice Weed and Pest Management Project 2008 Annual Research Report, Delta Research and Extension Center Mississippi Agricultural and Forestry Experiment Station, pp. 216-227. (Year: 2008).*
DE 10 2011 079 991A1, Use of Seed Treating-Agent Comprising Nicotinoid, 2012, Translation, Patent Translate powered by EPO and Google, 50 pages. (Year: 2012).*
Rosinger, C., Herbicide Safeners: an overview, Julius-Kühn-Archiv, 2014, Nr. 443, Julius Kühn Institute, Germany.
De Snoo, G., Van Der Poll, R., Effect of herbicide drift on adjacent boundary vegetation, Agriculture, Ecosystems & Environment, Mar. 22, 1999, pp. 1-6, 73-1, Elsevier B.V.
Vangessel, M., Johnson, Q., Evaluating drift control agents to reduce short distance movement and effect on herbicide performance, Weed technology, Jan. 2005, pp. 78-85, 19-1, WSSA Online and Allen Press Publishing Services, USA.
Culpepper, A. S., York, A.C., Marth, J. L., Corbin, F.T., Effect of insecticides on clomazone absorption, translocation, and metabolism in cotton, Weed Science, Sep. 2001, pp. 613-616, vol. 49.5, WSSA Online, Allen Press Publishing Services, USA.

(Continued)

Primary Examiner — John Pak
Assistant Examiner — Andriae M Holt
(74) Attorney, Agent, or Firm — Quarles & Brady LLP

(57) ABSTRACT

Methods of increasing the tolerance of a plant to an herbicide and seeds for carrying out these methods are provided herein. The methods include treating the seeds of the plant with an insecticide prior to planting. The insecticide treatment makes the resulting plant more resistant to herbicides and in particular to post-emergence herbicides as compared to untreated seeds. The plants suitably do not have complete natural or complete engineered resistance to the herbicide. The treated seeds are then planted in a field and the herbicide is applied to the field. The resulting plants growing from the treated seeds have increased tolerance to the herbicide as compared to plants grown from seeds not treated with the insecticide.

8 Claims, 13 Drawing Sheets

(56) References Cited

OTHER PUBLICATIONS

Davis, B., Scott, R.C., Norsworthy, J.K., Gbur, E., Response of rice to low rates of glyphosate and glufosinate, Weed technology, pp. 198-204, vol. 25.2, WSSA Online and Allen Press Publishing Services, USA, 2011.

Dickinson, J.W., Scott, R.C., Davis, B.M., Response of the Conventional Rice Varieties Roy J and Wells to Low Soil Concentrations of Imazethapyr, B.R. Wells Arkansas Rice Research Studies, 2013, pp. 206-211, Aug. 2014, University of Arkansas, Arkansas, USA.

Hardke, J.T., Wilson, C.E., Trends in Arkansas rice production, B.R. Wells Rice Research Studies 2012, Aug. 2013, pp. 38-47, University of Arkansas, Arkansas, USA.

Hensley, J.B., Webster, E.P., Blouin, D.C., Harrell, D.L., Bond, J.A., Impact of drift rates of imazethapyr and low carrier volume on non-Clearfield Rice, Weed Technology, Apr.-Jun. 2012, pp. 236-242, vol. 26, WSSA Online and Allen Press Publishing Services, USA.

Plummer, W.A., Lorenz, G.M., Taillon, N.M., Thrash, B.C., Fortner, J.W., Colwell, C.K., Impact of insecticide seed treatments in large block field trials in Arkansas 2009-2011, B.R. Wells Rice Research Studies 2011, Aug. 2012, pp. 128-132, University of Arkansas, Arkansas, USA.

Wilf, H., Lorenz III, G., Colwell, K., Taillon, N., Comparing the efficacy of insecticide seed treatments at three seeding rates, B.R. Wells Rice Research Studies 2009, Aug. 2010, pp. 103-109, University of Arkansas, Arkansas, USA.

Wilson, C.E., Runsick, S.K., Mazzanti, R., Trends in Arkansas rice production, B.R. Wells Rice Research Studies 2009, Aug. 2010, pp. 11-21, University of Arkansas, Arkansas, USA.

York, A.C., Jordan, D.L., Cotton (*Gossypium hirsutum*) response to clomazone and insecticide combinations, Weed Technology, Oct.-Dec. 1992, pp. 796-800, vol. 6.4, WSSA, USA.

York, A.C., Jordan, D.L., Frans, R.E., Insecticides modify cotton (*Gossypium hirsutum*) response to clomazone, Weed Technology, Oct.-Dec. 1991, pp. 729-735, vol. 5.4, WSSA, USA.

Hensley, J.B., Webster, E.P., Harrell, D.L., Bottoms, S.L., Herbicide drift:affects Louisiana rice production, Louisiana Agriculture, 2009, pp. 6-7, vol. 52.1, Louisiana Agricultural Experiment Station, Baton Rouge, USA.

\* cited by examiner

Figure 1: Newpath 0.5 oz/A 20 DAT
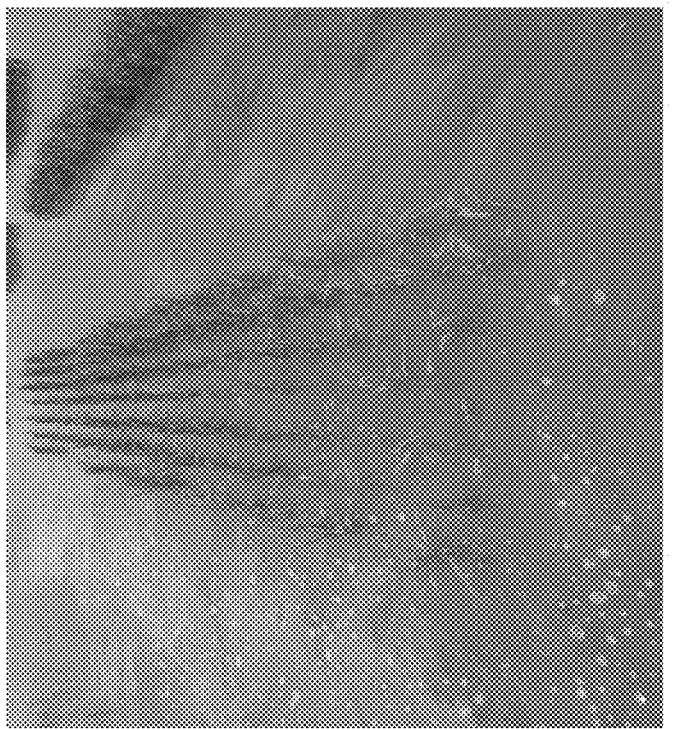
Untreated
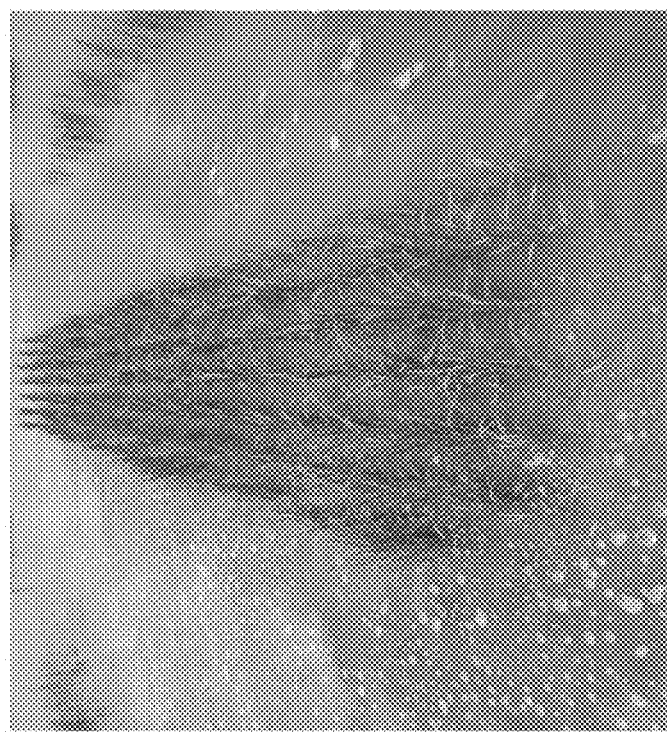
Treated

Figure 2: Roundup 4 oz/A 20 DAT
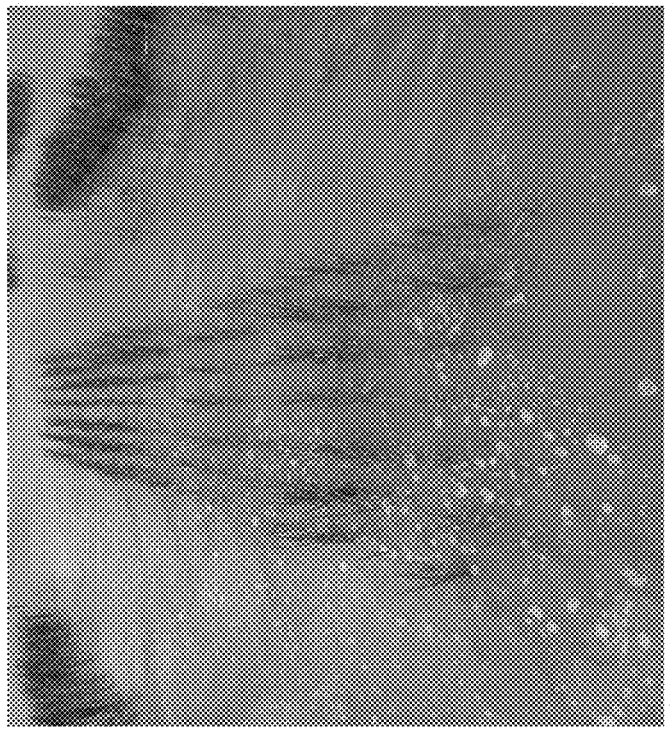
Untreated
Treated

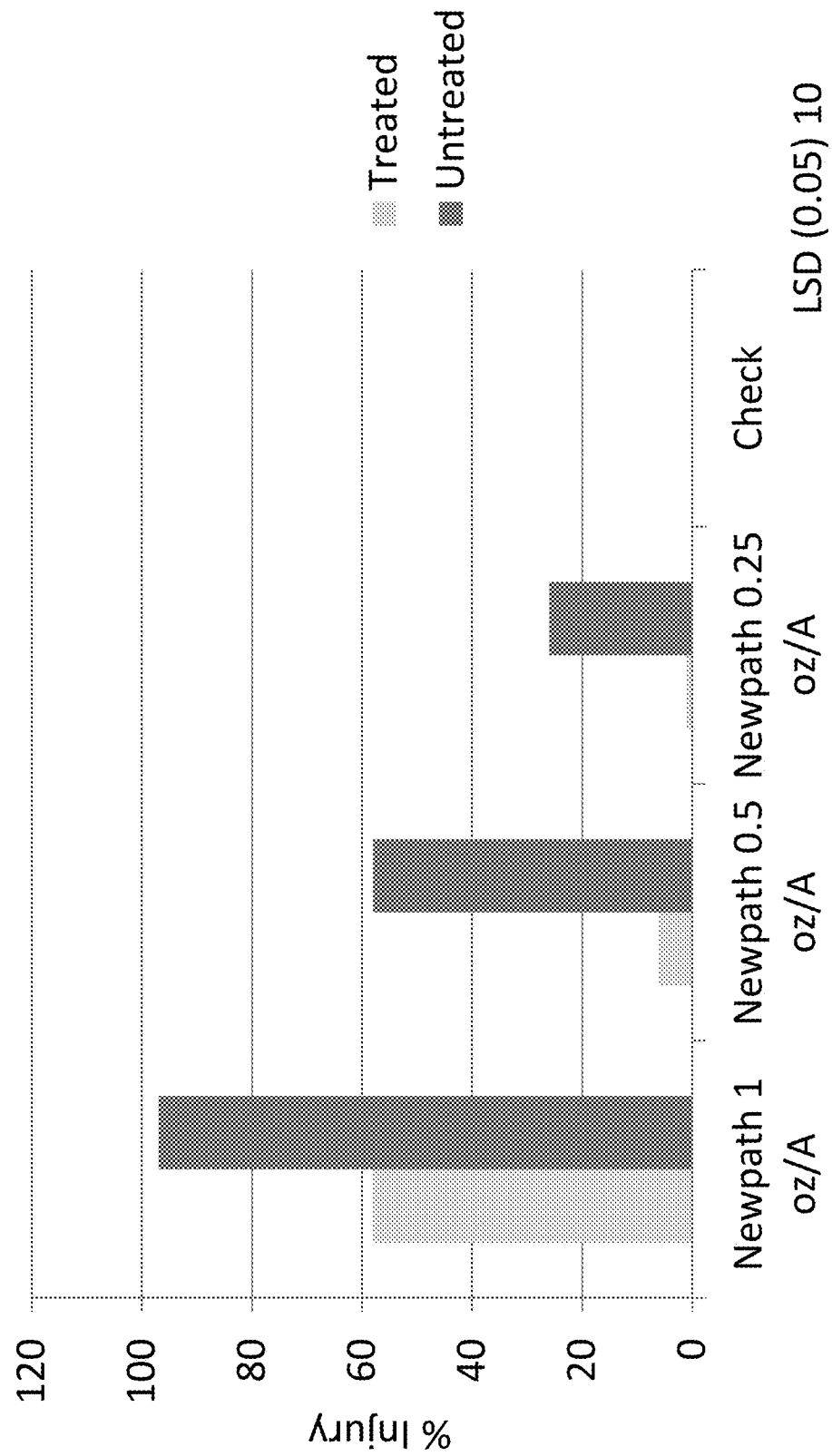

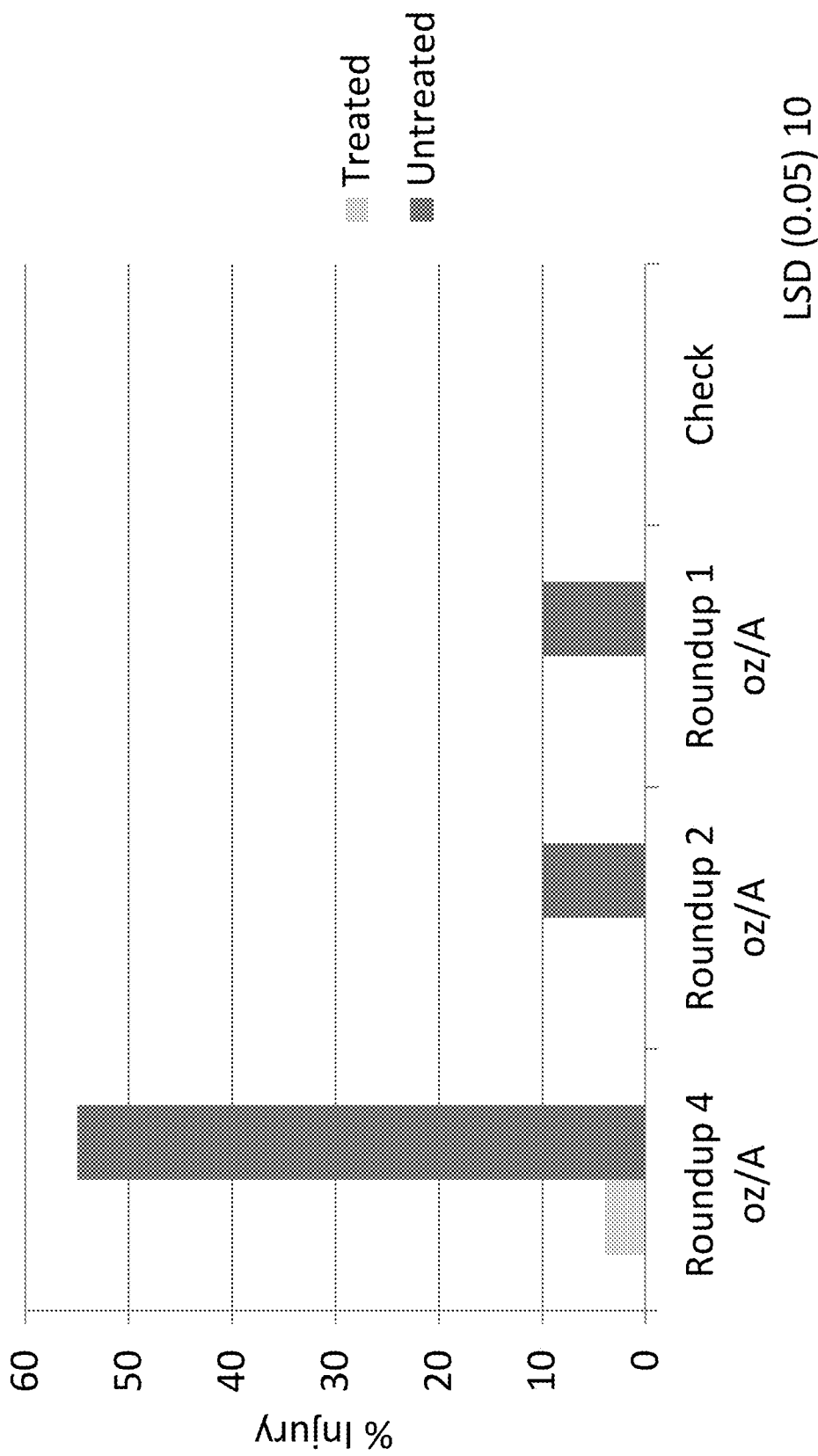

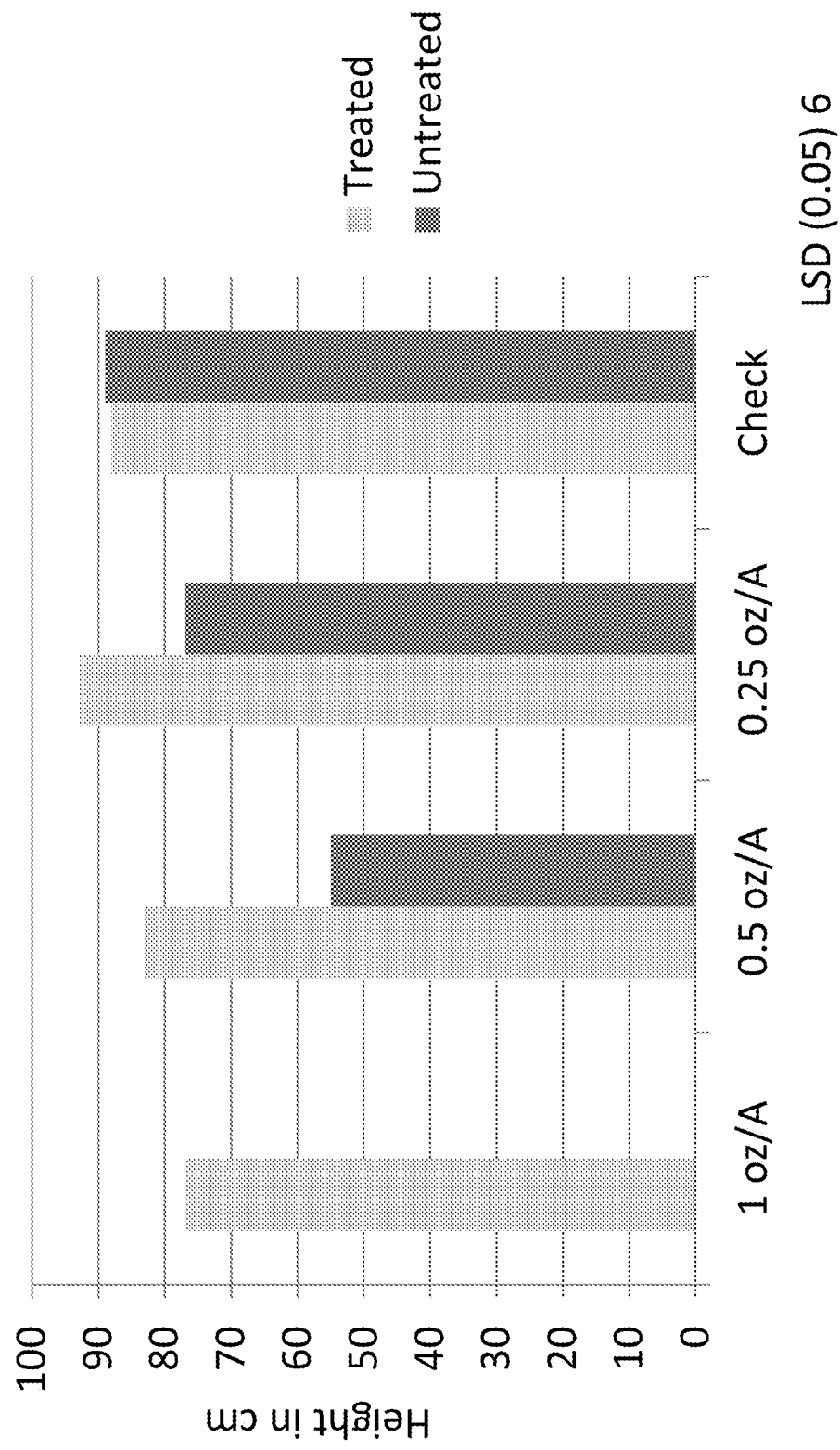

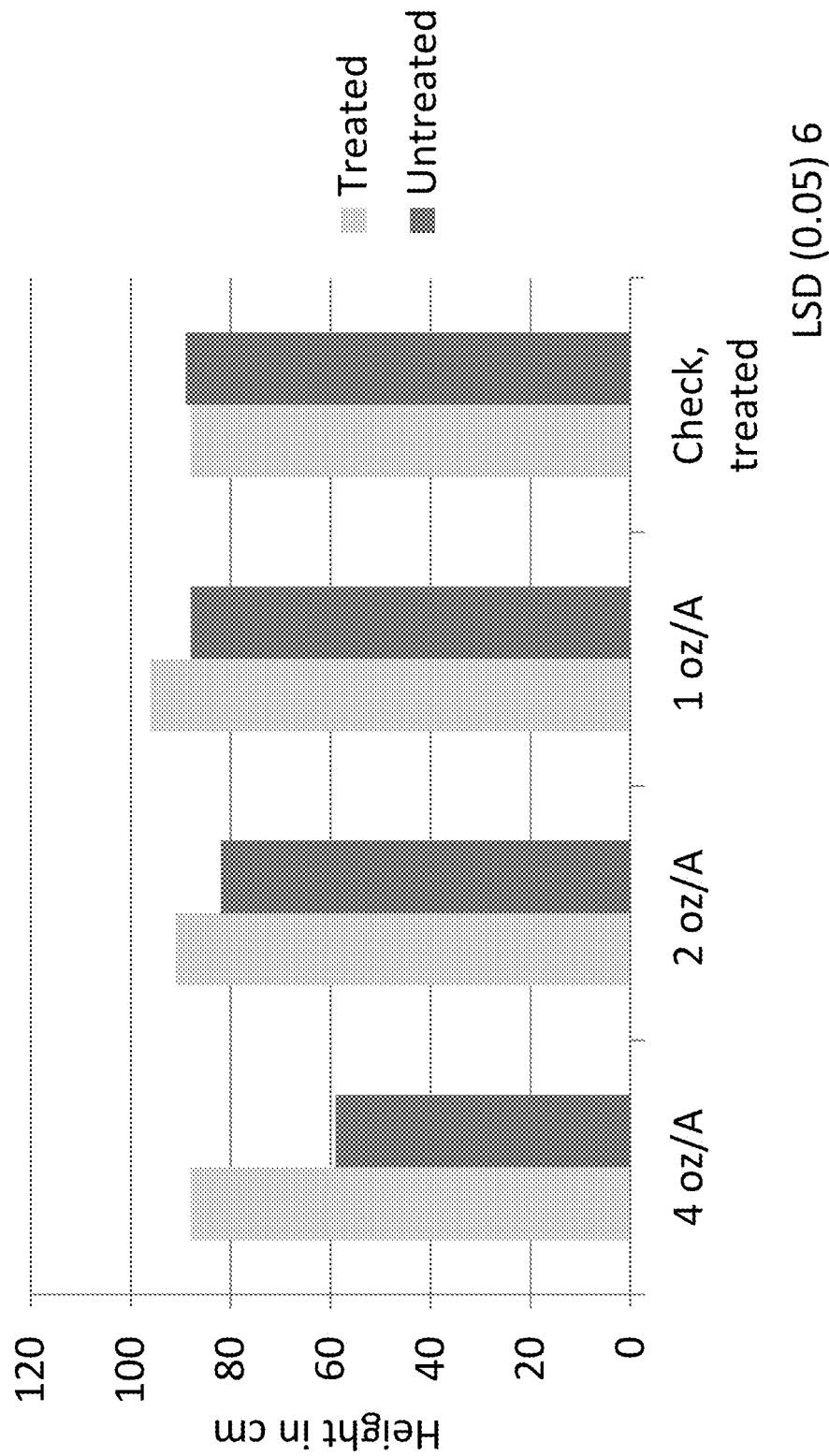

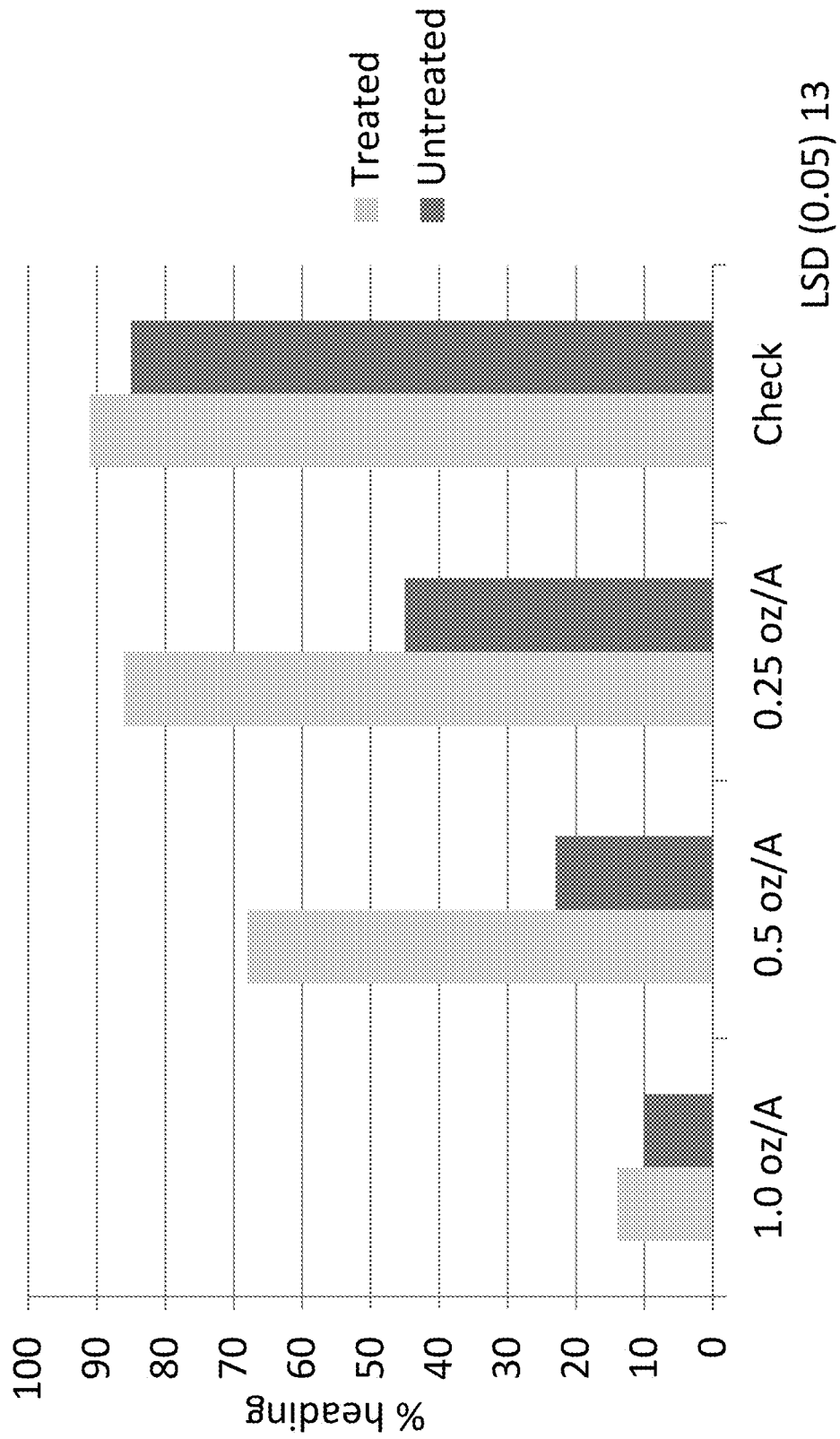

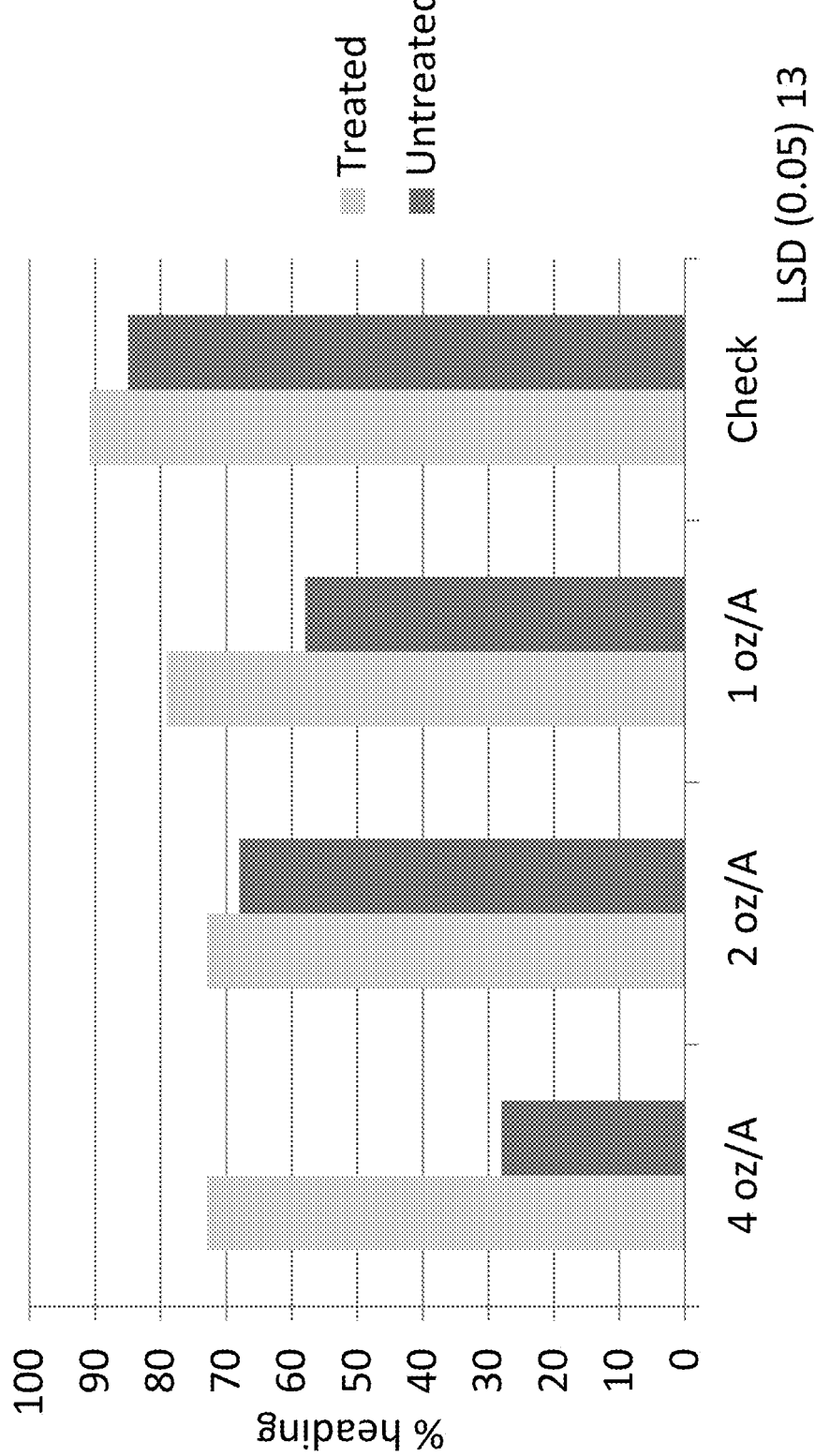

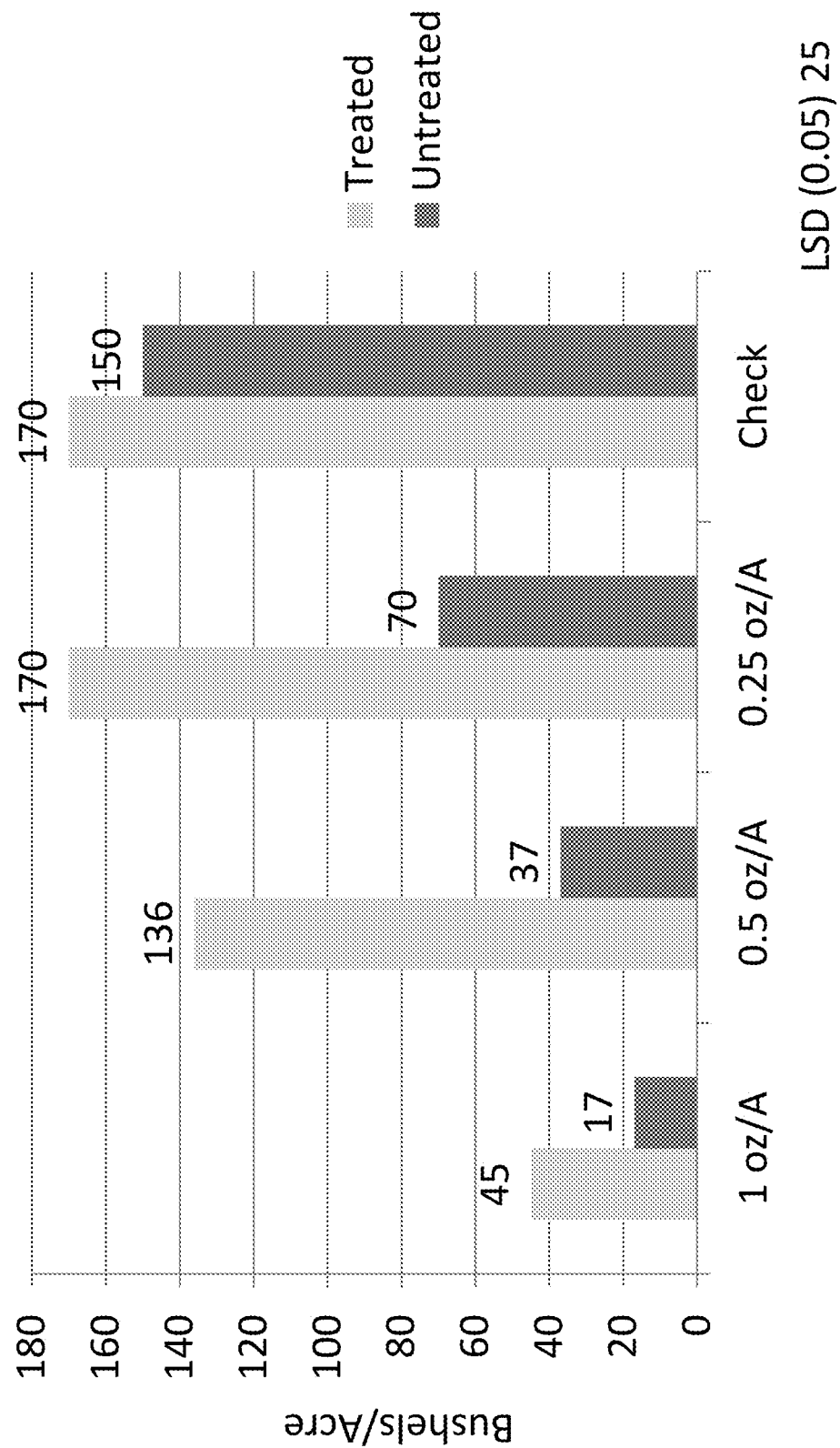

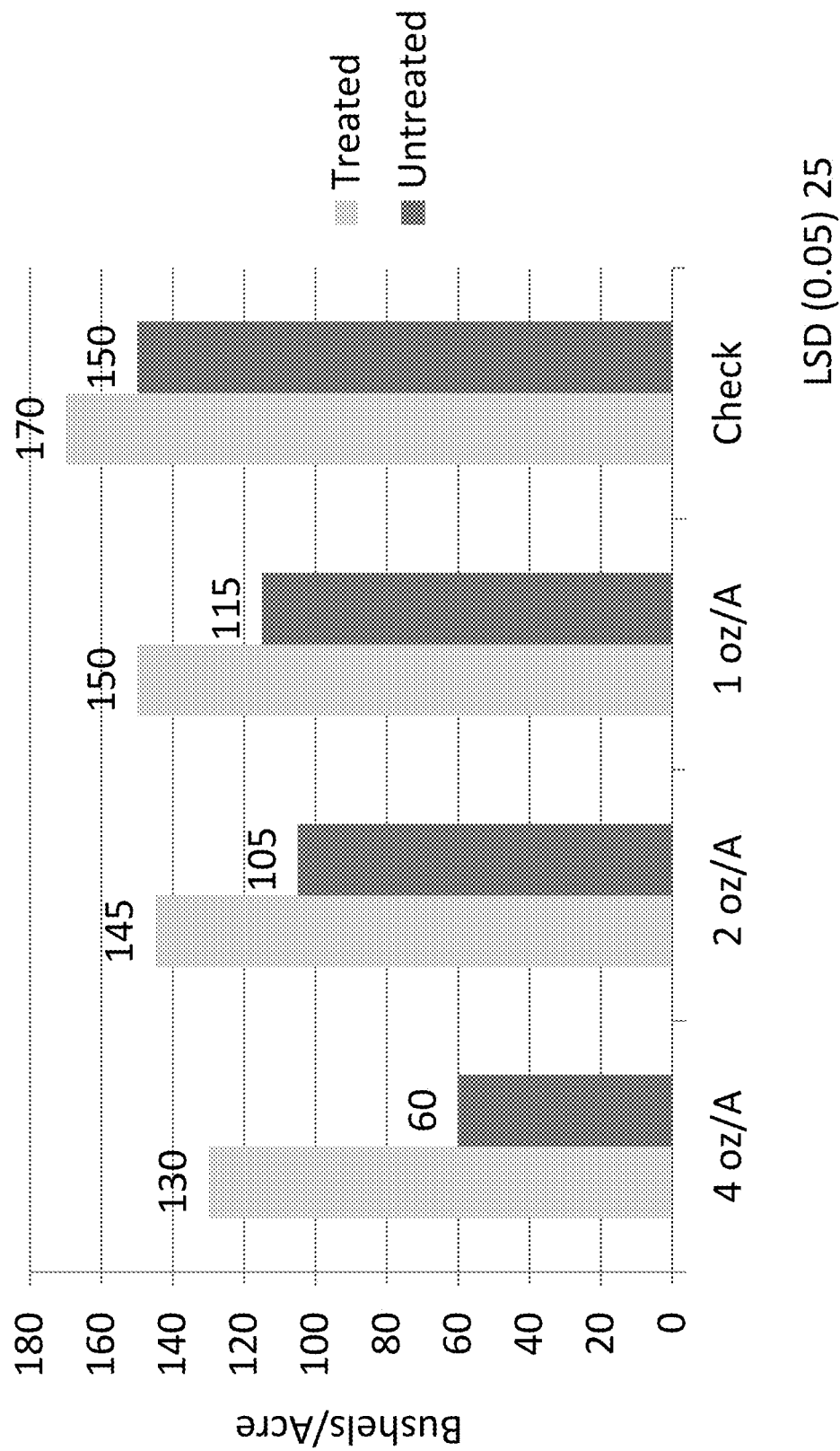

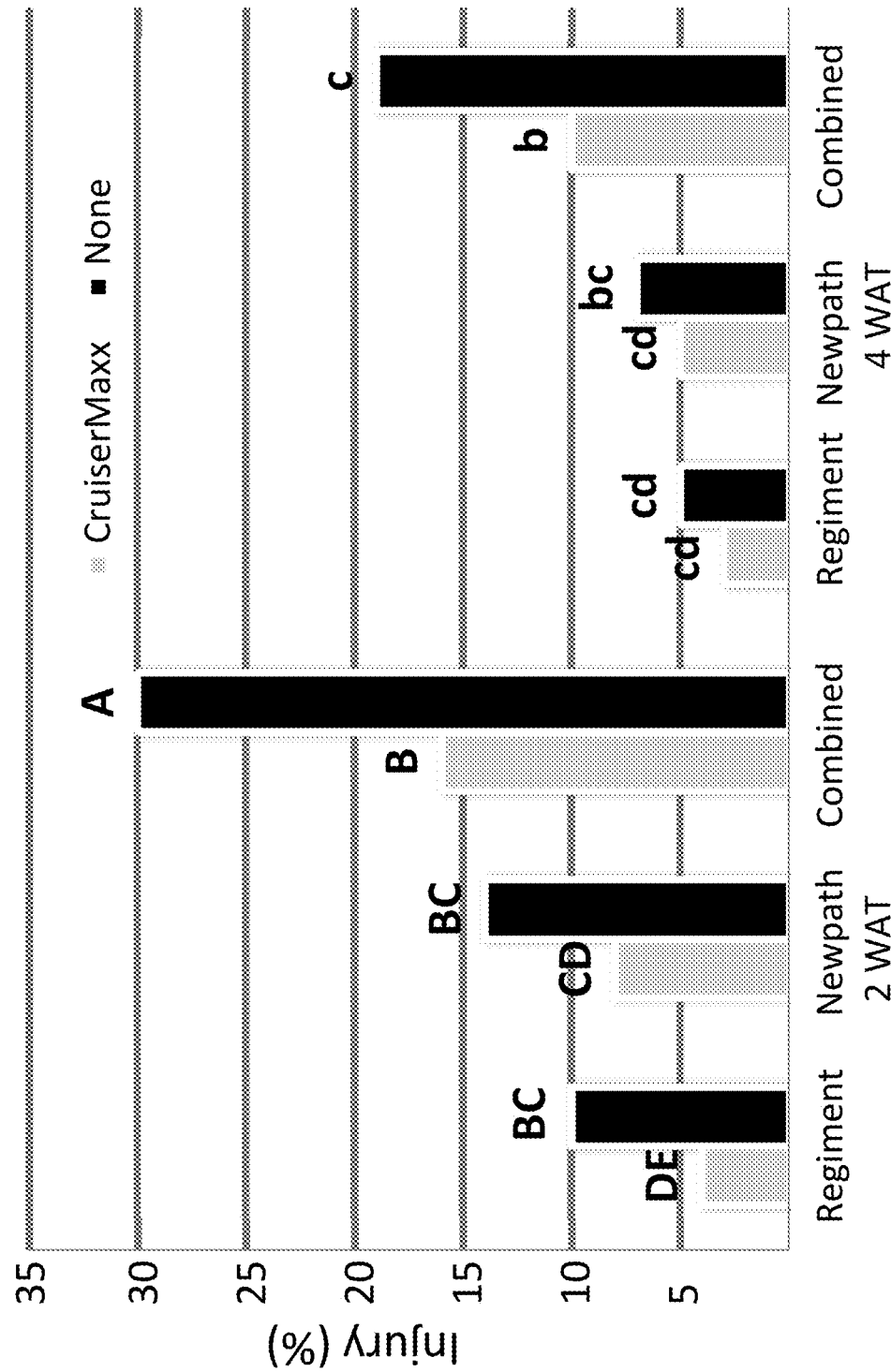

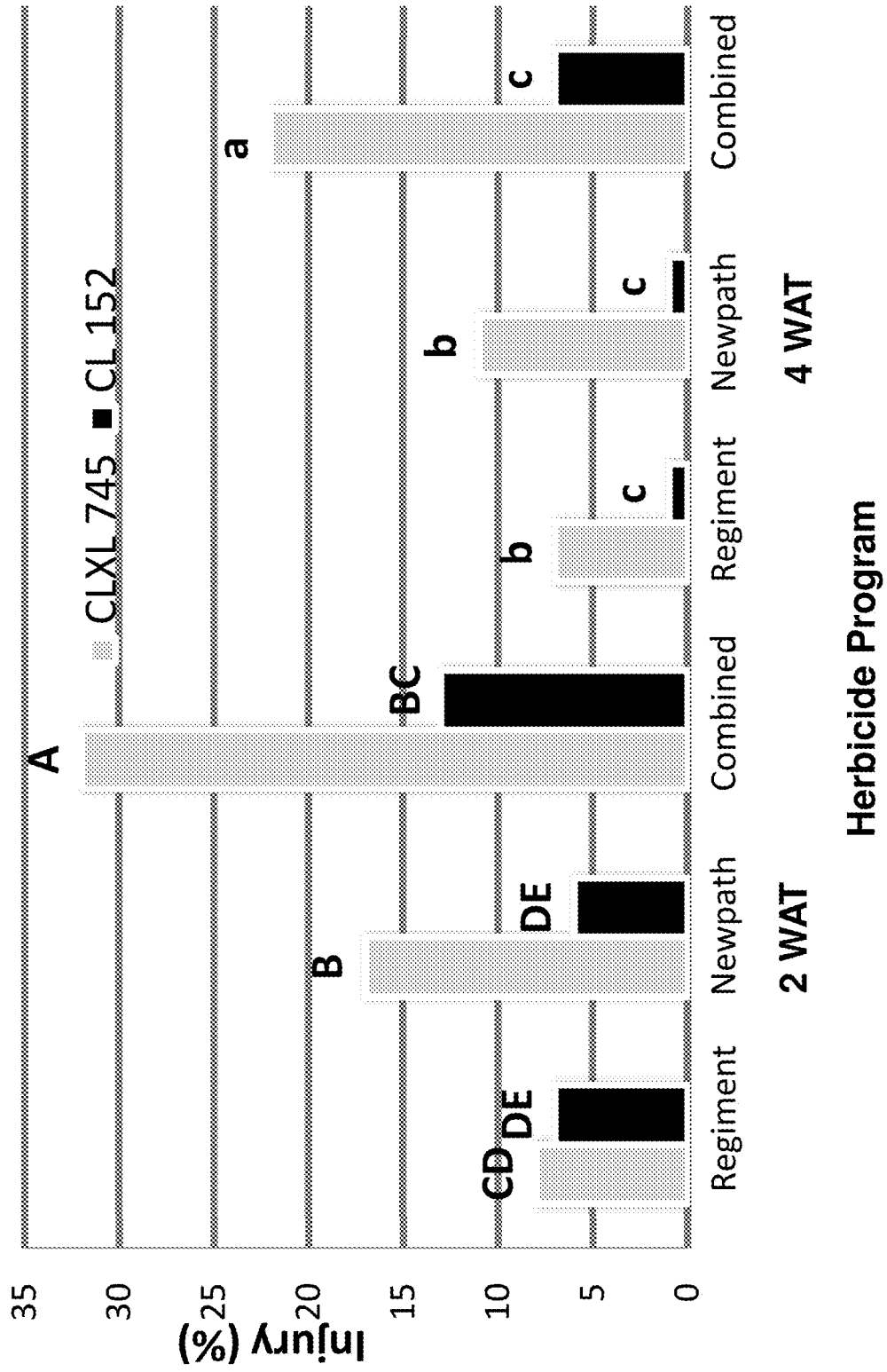

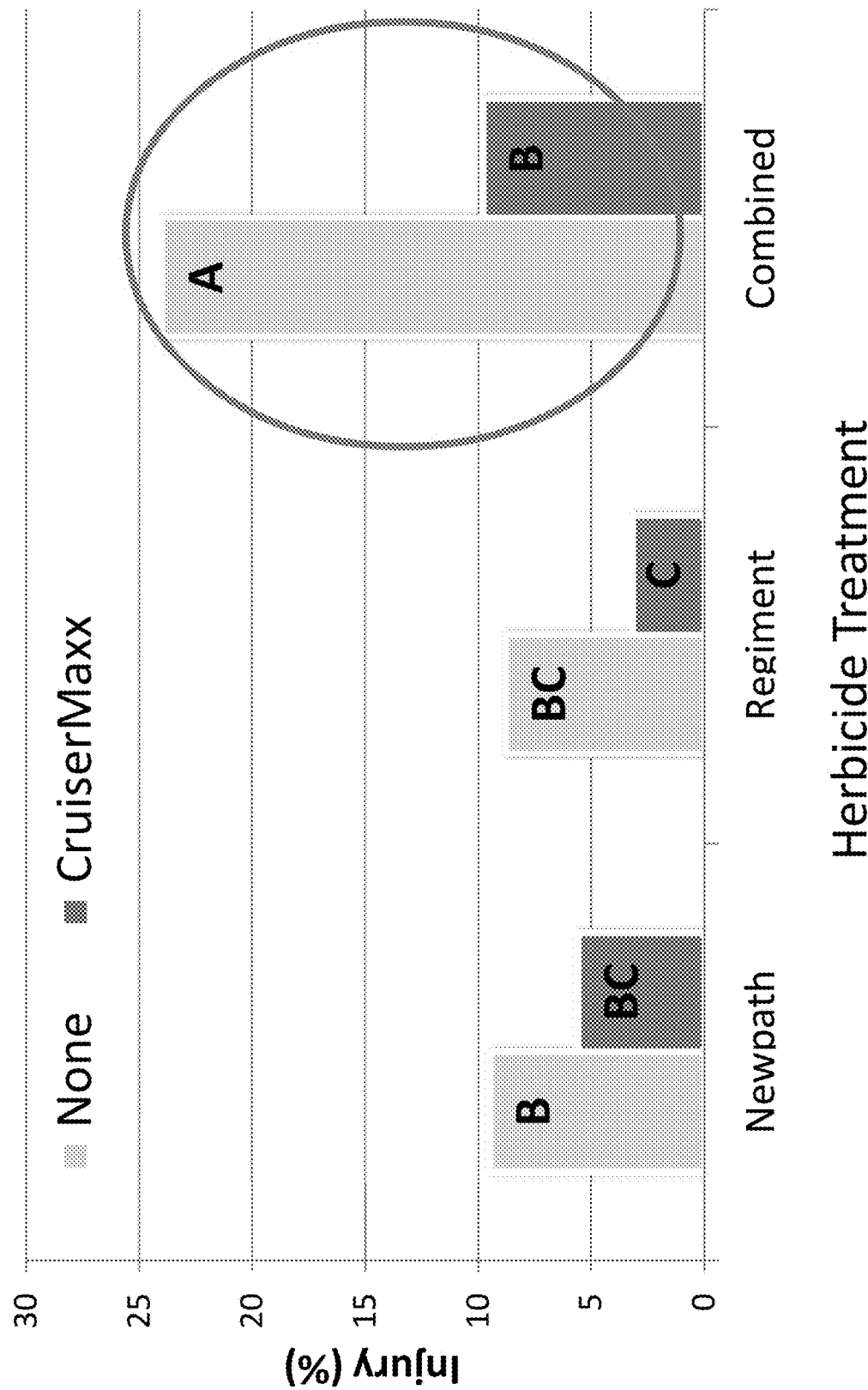

METHOD OF IMPROVING TOLERANCE OF PLANTS TO HERBICIDES USING SEED INSECTICIDE TREATMENTS

CROSS-REFERENCE TO RELATED APPLICATIONS

This patent application claims the benefit of priority of U.S. Provisional Patent Application No. 62/142,160, filed Apr. 2, 2015, which is incorporated herein by reference in its entirety.

INTRODUCTION

Methods and seeds for increasing the tolerance of plants to herbicide treatments are provided herein.

Currently over 50% of the rice grown in Arkansas is planted to Clearfield rice which is tolerant to applications of the herbicides Newpath (imazethapyr) and Beyond (imazamox). The remainder of the rice grown in the state lacks the Clearfield tolerance trait and is therefore susceptible to injury if Newpath or Beyond is somehow applied to the field either through tank-contamination, drift, or by accidental application. Clearfield hybrids are susceptible to variable levels of herbicide damage and experience decreased yields when treated with the herbicide. In addition, there are over 3 million acres of soybean grown in Arkansas in close proximity to rice. The majority of these soybean acres are Roundup Ready and receive applications of the herbicide Roundup (glyphosate). Previous research has shown that both Newpath and Roundup can be harmful to rice yields depending on rate and timing of exposure.

In previous research, York et al. (1991) found that disulfoton and phorate greatly reduced clomazone injury to cotton when applied in-furrow. Similar results with the in-furrow applications of phorate were also documented; however not for the insecticide aldicarb in 1990 and 1991 (York and Jordan, 1992). Both these reductions in crop injury were observed in the relative absence of insect pressure. This effect was later quantified in the lab by Culpepper et al. (2001). They determined that this "safening effect" was due to the insecticide causing a change in the metabolism of clomazone in cotton, suggesting that some clomazone metabolite may be more toxic to cotton than the compound itself. Nonetheless, this work does represent a precedent for using a soil or in-furrow insecticide treatment to "safen" a crop to a given herbicide. In fact, this was a common practice throughout the mid-to-late 90's and early in the 2000's in cotton production prior to the introduction of Roundup Ready™ cotton.

Wilf et al. in 2010 and later Plummer et al. in 2012 documented many benefits of insecticide seed treatments in rice. Some of these benefits include overall improved plant vigor that may or may not be due to insect pressure but to other biological processes inside young rice seedlings as they are affected by the presence of the insecticide.

SUMMARY

We noted that some insecticide-treated rice plots were able to tolerate an accidental herbicide drift from an adjacent field. The ability to safen rice to potential herbicide drift or injury from other herbicides would be a valuable benefit for rice producers today. As shown and claimed herein insecticide seed treatment of rice protected the plants from herbicide exposure and was able to increase the herbicide tolerance of hybrid or partially tolerant plants to the herbicide and decreased injury to the plants resulting from herbicide application.

In one aspect, methods of increasing the tolerance of a plant to an herbicide are provided. The methods include treating the seeds of the plant with an insecticide prior to planting. The insecticide treatment makes the resulting plant more resistant to herbicides and in particular to post-emergence herbicides. The plants suitably do not have complete natural or engineered resistance to the herbicide. The treated seeds are then planted in a field and the herbicide is applied to the field. The resulting plants growing from the treated seeds have increased tolerance to the herbicide as compared to plants grown from seeds not treated with the insecticide.

In another aspect, seeds treated with an insecticide prior to planting are provided. The seeds may be provided with instructions to apply an herbicide after emergence. The instructions may additionally provide information about combinations of herbicides for use in cultivating the plants.

BRIEF DESCRIPTION OF THE DRAWINGS

FIG. 1 is a set of photographs of two rice plots showing the insecticide treated and untreated rice plants 20 days after application of 0.5 oz/A of Newpath.

FIG. 2 is a set of photographs of two rice plots showing the insecticide treated and untreated rice plants 20 days after application of 4 oz/A of Roundup.

FIG. 3 is a bar graph showing the percentage of rice injury in insecticide treated and untreated rice plants 50 days after treatment with the indicated concentrations of Newpath.

FIG. 4 is a bar graph showing the percentage of rice injury in insecticide treated and untreated rice plants 50 days after treatment with the indicated concentrations of Roundup FIG. 5 is a bar graph showing the rice canopy heights in insecticide treated and untreated rice plants 68 days after treatment with the indicated concentrations of Newpath.

FIG. 6 is a bar graph showing the rice canopy heights in insecticide treated and untreated rice plants 68 days after treatment with the indicated concentrations of Roundup.

FIG. 7 is a bar graph showing the percentage of rice heading in insecticide treated and untreated rice plants at 90 days after treatment with the indicated concentrations of Newpath.

FIG. 8 is a bar graph showing the percentage of rice heading in insecticide treated and untreated rice plants at 90 days after treatment with the indicated concentrations of Roundup.

FIG. 9 is a bar graph showing the average bushels per acre of rice yield after Newpath exposure in plants from seeds treated and untreated with insecticide.

FIG. 10 is a bar graph showing the average bushels per acre of rice yield after Roundup exposure in plants from seeds treated and untreated with insecticide.

FIG. 11 is a bar graph showing the percent injury to plants at 2 and 4 weeks after final herbicide application (WAT) as influenced by insecticide seed treatment averaged over varieties. Combined herbicide program consisted of two applications of Newpath plus Regiment. Uppercase and lowercase letters are for separating means at 2 WAT and 4 WAT, respectively.

FIG. 12 is a bar graph showing the percentage injury to plants at 2 and 4 weeks after final herbicide application as influenced by variety and combined over seed treatments. Combined herbicide program consisted of two applications of Newpath plus Regiment. Uppercase and lowercase letters are for separating means at 2 WAT and 4 WAT, respectively.

FIG. 13 is a bar graph showing the percent injury to plants at 6 weeks after final herbicide application (WAT) as influenced by insecticide seed treatment averaged over varieties. Combined herbicide program consisted of two applications of Newpath plus Regiment. Uppercase letters are for demonstrating statistically significant differences between means.

DETAILED DESCRIPTION

Methods of increasing the tolerance of a plant to an herbicide are provided herein. The methods include treating the seeds of the plant with an insecticide prior to planting. The insecticide treatment makes the resulting plant more resistant to post-emergence and pre-emergence herbicides. The plants are suitably plants that do not have complete natural or engineered resistance to the applied herbicide. The plants may be hybrids with only partial tolerance to the herbicide or plants for which an herbicide is not recommended for use without the insecticide seed treatment described herein due to incomplete resistance of the plant to the herbicide leading to injury to the plant. The treated seeds are then planted in a field and the herbicide is applied to the field. The resulting plants growing from the treated seeds have increased tolerance to the herbicide as compared to plants grown from seeds not treated with the insecticide.

The herbicide may be applied at levels recommended for weed control or at levels below those recommended for weed control. The herbicide application may be pre-emergence or post-emergence herbicide or a combination thereof. The herbicide may be applied more than one time, such as two, three or four separate applications during the growing season and may include combinations of various herbicides. The herbicide may be directly applied to the plants. The methods provided herein to increase the tolerance of a plant to an herbicide also include applying recommended or lower levels of the herbicide to the plant. Application of lower levels of an herbicide means applying levels at least 5%, 10%, 20%, 30%, 40%, 50%, 60%, 70% or more below the levels of herbicide recommended for the application by the manufacturer. Alternatively the herbicide may be applied at levels appropriate for maximal weed control such as those levels recommended by the manufacturer. In an alternative embodiment, the herbicide application may be the result of drift or overspray from an adjacent field. A second herbicide to which the plant does have complete natural or engineered resistance may also be applied to the plants.

In another embodiment, the plants are resistant to a second herbicide and the plants are grown from the insecticide treated seeds and then exposed to both the herbicide to which the plants are resistant and the herbicide to which the plants are not completely naturally or engineered to be completely resistant. In this embodiment, the plants grown from the insecticide treated seeds grow better than plants from seeds not treated with the insecticide and weed control with the combination of herbicides is also better than with the herbicide to which the plants are tolerant alone.

Seeds treated with an insecticide prior to planting to increase the tolerance of the plants grown from the treated seeds to an herbicide as compared to plants grown from untreated seeds are also provided herein. Untreated seeds are seeds that are not treated with an insecticide, but may be treated with a fungicide or other seed treatments to enhance growth of the seeds. The seeds treated with the insecticide may be provided with instructions to apply an herbicide to plants which would normally not be tolerant to the herbicide or plants to which the herbicide would normally cause injury or damage. The herbicide may be allowed to be used at a higher level on seeds treated with the insecticide as compared to the allowed level of use on untreated seeds. The increased levels of herbicide may be more effective for weed control. Alternatively, the insecticide treated seeds may produce plants less prone to injury resulting from the herbicide treatment. The reduction in injury may be dependent upon other factors such as weather, moisture, soil conditions, etc. in combination with the insecticide seed treatment. Use of an increased level or distinct type of herbicide on the insecticide treated plants may result in more effective weed control without loss in yield or damage to the crop. The instructions may additionally provide information about combinations of herbicides for use in cultivating the plants whose seeds were treated with the herbicide.

The plants and seeds for use herein include rice, oilseeds and grains. Exemplary plants and seeds include but are not limited to rapeseed, canola, safflower, sunflower, soy, flax, corn, wheat, grain sorghum, cotton, and oats. The plants suitably do not have complete natural or engineered resistance to the herbicide used in the methods. Plants with partial tolerance to an herbicide, without complete natural resistance or without engineered resistance to the herbicide includes all plants which experience any measure of injury to the plant after application of the herbicide. The injury to the plant treated with the herbicide as compared to plants not treated with the herbicide (in the absence of an insecticide seed treatment) may be 10%, 15%, 20%, 25%, 30%, 35%, 40% or even 50% or more. Injury may include decreased growth, increased damage to or delay in growth of the treated plant, decreased production compared to control plants. The plants may have partial natural or engineered resistance to the herbicide or may have complete natural or engineered resistance to a second herbicide which can also be applied to the plants. Natural resistance to an herbicide may be due to the herbicide targeting an enzyme or activity that the plant or seed used in the methods does not possess or possesses at low levels or the enzyme in the plant is at least partially naturally resistant to the herbicide activity. A plant may be engineered to have resistance to an herbicide. For example Clearfield® rice or Round-up Ready® soybeans are engineered to be resistance to certain herbicides (imidazolinone and glyphosate, respectively). Engineering of a plant includes genetic engineering through the generation of transgenic plants. Some plants may have partial tolerance to the herbicide. For example, a Clearfield rice hybrid may have insufficient tolerance to the herbicide to allow normal levels of herbicide use to provide adequate weed control without causing at least some damage to the crop.

Alternatively, the Clearfield or Round-up ready plants may be damaged by alternative herbicides to which the plants are not engineered to be tolerant. We show in the Examples that treatment of these Clearfield hybrid seeds with an insecticide can increase the tolerance of the hybrid to the herbicide allowing the herbicide to be applied at recommended levels for weed control without causing significant injury or while minimizing the injury to the hybrid plants and/or decreasing the damage to the resulting crop. In addition to hybrids such as shown in the Examples, other plants with only partial natural or engineered tolerance to an herbicide may be safened by treating the seeds with an insecticide. This would allow use of a broader spectrum of herbicides on a broader set of plant varieties while minimizing any deleterious effects and injury to the resulting plants or crops.

The insecticides for use in coating the seeds of the plant may be neonicotinoids, diamides, chlorantraniliprole or others. The neonicotinoids include but are not limited to thiamethoxam, acetamiprid, imidacloprid, nitenpyram, nithiazine, thiacloprid and clothianidin. The amounts of the insecticides used are within the range the manufacturers suggest for use in insect control for the plant. In the Examples, CruiserMaxx Rice insecticide was applied at 7 oz/cwt of seed. CruiserMaxx Rice contains 26.4% thiamethoxam, 1.65% mefenoxam, 1.32% azoxystrobin, and 0.28% fludioxonil. The insecticide may be used in combination with fungicides and is suitably applied to the seed as a coating or powdered application to the seed. In an alternative embodiment the insecticide may be applied in furrow.

The herbicides for use in the methods may any of those known to those of skill in the art including but not limited to glyphosate, glufosinate, an ALS inhibitor, a PPO inhibitor, an ACC inhibitor, an HPPD inhibitor, or DOXP synthase inhibitor, VLCFA inhibitor, Synthetic auxins, PSI or PSII inhibitors. In the Examples, the effects have been observed for these herbicides on either rice or soybean: Roundup (glyphosate), Newpath (imazethapyr), Liberty (glufosinate), pethoxamid, and Assure II (quizalofop). An ALS inhibitor may be selected from the group consisting of Imidazolinones, Sulfonylamino-carbonyltriazolinones, Triazolpyramidines, Triazolones and Sulfonylureas. A PPO inhibitor may be selected from the group consisting of Diphenylether, N-phenylphthalimide, Thiadiazole and Triazolinone. An ACC inhibitor may be selected from the group consisting of Aryloxyphenoxy propionate (Fop), Cyclohexanediones (Dim) and Phenylpyrazolin (Den). The herbicide may be selected from glyphosate, imazethapyr, glufosinate, pethoxamid, and quizalofop.

As shown in the Examples, the insecticide treatment of the seeds prior to planting increases the tolerance of the plants derived from the seeds to post-emergence herbicides. The effects of insecticide treatment of the seeds to pre-emergent herbicides are ongoing and we expect similar results. The increased tolerance of the plants to herbicides may be measured as increased growth of the plants, decreased damage to the plants, decreased delay in growth of the treated plants, increased yield and decreased growing days to production compared to control plants whose seeds are not treated with the insecticide. After treatment of the seeds and exposure to the herbicide the treated plants may experience 10%, 15%, 20%, 25%, 30%, 35%, 40%, 45%, 50% or even more reduced levels of injury from the exposure to the herbicide as compared to herbicide treated plants without an insecticide seed treatment. The difference in the percentage of injury of the plants generally increased over time after exposure. The growth of the insecticide seed treated plants followed by an herbicide application may be increased as compared to the absence of an insecticide seed treatment followed by an herbicide application (whether by direct application or drift) by 5%, 10%, 15%, 20%, 25%, 30%, 35%, 40% or more. Similarly, the maturation of the untreated plants may also be slowed as compared to the treated plants. The maturation of the non-insecticide-treated plants may be delayed by 2, 3, 4, 5, 6, 7, 8, 9, 10, 12, 14, 15, 16, 18, or even 20 days as compared to treated plants after application of the herbicide. The productivity of the treated plants may be increased by 10%, 15%, 20%, 25%, 30%, 35% or even 40% as compared to non-insecticide-treated plants also exposed to the herbicide.

The present disclosure is not limited to the specific details of construction, arrangement of components, or method steps set forth herein. The compositions and methods disclosed herein are capable of being made, practiced, used, carried out and/or formed in various ways that will be apparent to one of skill in the art in light of the disclosure that follows. The phraseology and terminology used herein is for the purpose of description only and should not be regarded as limiting to the scope of the claims. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to facilitate the disclosure and does not imply any limitation on the scope of the disclosure unless otherwise claimed. No language in the specification, and no structures shown in the drawings, should be construed as indicating that any non-claimed element is essential to the practice of the disclosed subject matter. The use herein of the terms "including," "comprising," or "having," and variations thereof, is meant to encompass the elements listed thereafter and equivalents thereof, as well as additional elements. Embodiments recited as "including," "comprising," or "having" certain elements are also contemplated as "consisting essentially of" and "consisting of" those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like. All percentages referring to amounts are by weight unless indicated otherwise.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The following examples are meant only to be illustrative and are not meant as limitations on the scope of the invention or of the appended claims.

EXAMPLES

Example 1: CruiserMaxx can Increase Tolerance of Rice to Herbicides

This experiment was conducted at a farm located just north of Lonoke, Ark. in the summers of 2013 and 2014. The soil texture is a silt loam with a pH of 6.3. Conventional rice (Roy J) was planted on Apr. 30, 2013 and May 20, 2014 with a Hege cone drill calibrated to deliver a seeding rate of 90 pounds (lbs)/Acre on 7.5-inch rows. Plot size was 5×25 feet. The study was conducted with a randomized complete block design having 4 replications.

Treatments consisted of seed treatment and herbicide combinations. The seed treatments consisted of "treated seed" on which CruiserMaxx Rice at 7 oz/100 lb of seed was applied. CruiserMaxx Rice contains 26.4% thiamethoxam, 1.65% mefenoxam, 1.32% azoxystrobin, and 0.28% fludioxonil. The second seed treatment was considered the "nontreated seed" which actually received equivalent amounts of azoxystrobin, mefenoxam and fludioxonil as the treated seed but without the insecticide thiamethoxam.

The herbicide treatments were applied at the 2-4 lf growth stage of rice with a $CO_2$ backpack sprayer calibrated to deliver 10 gallons of spray solution per acre. Herbicide treatments included Roundup PowerMax (5.5 lb ai/gallon formulation) applied at 0, 1, 2, and 4.0 oz product/A and Newpath 2AS (2 lb ai/gallon formulation) applied at 0, 0.25, 0.5 and 1.0 oz product/A. The plot area was maintained weed free with conventional rice herbicides and the rice was grown according to University of Arkansas recommendations for soil fertility.

Data collected included: percent visual injury at 7, 21, and 42 days after treatment (DAT) on a scale of 0 to 100 with 0 being no injury and 100 being complete crop death; canopy heights at 68 DAT using a yard stick and 1 meter square piece of cardboard, percent rice heading at 107 DAT, percent moisture, and grain yield at harvest. Data were analyzed and LSD's generated at the p=0.05 level of significance using ARM 9.1.4.

As early as 7 DAT, both Newpath and Roundup were causing visual injury to rice. Plants grown from the untreated rice seed were injured by Roundup from 13-33% depending on rate and this injury was significantly lower compared to plots with treated rice seed when the low rate of Roundup (1 oz/A) was evaluated at this time (Table 1). Newpath also caused injury ranging from 5-33% at 7 DAT depending on the rate. As with the Roundup treatments, injury from Newpath was already visually lower on rice plants in the treated seed plots, especially at the low rate (0.25 oz/A), where rice was injured about 10% less when seed was treated with the insecticide thiamethoxam in the form of CruiserMaxx Rice. Injury symptoms included stunting and chlorosis (yellowing).

TABLE 1

Effect of Newpath and Roundup at reduced rates on rice injury, plant canopy height, heading date, percent grain moisture and yield when applied to insecticide treated versus untreated "Roy J" rice seed, near Lonoke Arkansas in 2013 and 2014, averaged across years when possible (p = 0.05).

| Treatment | Herbicide Rate (fl oz/acre) | % Visible Injury 2013-14 7 DAT$^a$ | % Visible Injury 2013-14 21 DAT | % Visible Injury 2013 42 DAT | Height (in) 2013 68 DAT | % Heading 2013 107 DAT | Grain Yield 2013 Bu/A | Grain Yield 2014 Bu/A |
|---|---|---|---|---|---|---|---|---|
| Treated | 0 | 0 | 0 | 0 | 35 | 100 | 169 | 231 |
| Nontreated Newpath | 0.25 | 15 | 16 | 26 | 30 | 80 | 170 | 229 |
| Treated Newpath | 0.25 | 5 | 6 | 0 | 36 | 100 | 70 | 216 |
| Nontreated Newpath | 0.50 | 24 | 36 | 63 | 21 | 58 | 136 | 197 |
| Treated Newpath | 0.50 | 16 | 13 | 6 | 32 | 95 | 37 | 211 |
| Nontreated Newpath | 1.0 | 24 | 61 | 97 | — | 48 | 45 | 194 |
| Treated Newpath | 1.0 | 17 | 51 | 58 | 30 | 63 | 17 | 220 |
| Nontreated Roundup | 1.0 | 17 | 15 | 13 | 38 | 83 | 104 | 198 |
| Treated Roundup | 1.0 | 12 | 13 | 0 | 35 | 98 | 148 | 218 |
| Nontreated Roundup | 2.0 | 15 | 17 | 11 | 32 | 90 | 113 | 211 |
| Treated Roundup | 2.0 | 11 | 9 | 0 | 34 | 95 | 144 | 219 |
| Nontreated Roundup | 4.0 | 25 | 28 | 53 | 23 | 78 | 59 | 221 |
| Treated Roundup | 4.0 | 25 | 16 | 10 | 36 | 95 | 128 | 221 |
| LSD (p = 0.05) |  | 8 | 10 | 21 | 8 | 9 | 25 | 30 |

[†]Nontreated refers to seed that did not receive an insecticide seed treatment but did receive fungicide seed treatment.
[‡]Treated refers to seed that received an insecticide seed treatment in addition to a fungicide seed treatment.

By 21 DAT, injury symptoms had become more pronounced for all treatments. Both treated and untreated seed plots were injured over 50% by Newpath at 1.0 oz/A. See FIG. 1. However, some differences were also becoming more pronounced. For example, where Newpath was applied to rice plants grown from non-treated seed it injured rice 36% versus only 13% for plants grown from treated seed. Roundup at 4.0 fl oz/A injured plots with treated seed 12% less than when seed was not treated. See FIG. 2.

Although injury had been equal for Newpath applied at 1.0 oz/A to rice from both treated and untreated seed at 21 DAT in 2013, in 2014 rice injury was reduced to less than 10% for all treatments. By 42 DAT treated seed plots had recovered and injury for treated versus untreated was 58 and 97%, respectively in 2013. Other herbicide seed treatment interactions were even more pronounced at 42 DAT. Newpath applied at 0.25 oz/A to treated plots was rated zero at this time versus 26% for untreated plots. Injury from this rate of Newpath to plants grown from untreated rice seed was consistently rated at 25% for the duration of the test. At 0.5 fl oz/A Newpath, injury to the treated seed plots had dropped to 6%, versus 63% in plots with untreated seed. Roundup applied at 4.0 fl oz/A resulted in 53% injury to the untreated rice seed plot versus only 10% when rice seed was treated. FIGS. 3 and 4 show the percent injury for the treated and untreated rice at 50 days after treatment. At all three application rates and with both Newpath and Roundup the treated rice show less injury in 2013. The later planting date and warmer, sunnier growing conditions in 2014 as compared to 2013 may account for differences in rice recovery between years.

Canopy heights were not affected in 2014. Treatment differences were also observed in canopy height data taken at 68 DAT in 2013 (Table 1). Rice plants that did not receive any herbicide treatment, regardless of seed treatment grew to a canopy height of 88 cm (35 inches). Canopy heights were taken using a yard stick and a 1 meter square piece of cardboard in a method previously described by Davis et al. (2011). Newpath reduced canopy height at the 0.5 and 1.0 oz/A rates by 40 and 88 cm, respectively, when applied to non-insecticide treated seed plots. See FIG. 5. There were not enough rice plants in the 1.0 oz/A Newpath treatment to get a canopy height due to the severe stand reduction where no insecticide seed treatment was used. However, the rice in the treated plots survived 1.0 fl oz/A of Newpath and resulted in a canopy height of 76 cm (30 inches), not statistically different from the control (88 cm; 35 inches).

Roundup in general did not affect canopy height as severely as Newpath. Both treated and untreated rice plants treated with 1.0 or 2.0 oz/A Roundup produced canopy heights from 87-96 cm in height, not statistically different from the control. See FIG. 6. However, at the 4.0 oz/A rate the rice in the untreated plot grew to 58 cm, while the treated rice plants reached a normal height for this test of 91 cm by 68 DAT (Table 1).

Percent heading and moisture data and grain yields were obtained at 107 DAT in this study. In 2014 no significant differences were observed. For purposes of this study a common harvest date was selected to simulate a decision that a grower might have to make as to when to harvest a field with varying degrees of injury. For this reason the above mentioned harvest parameters might have been slightly different if, for example, some of the more severely injured plots were given more time to mature and dry down. Likewise, the less injured plots could have been harvested sooner. However, due to study design this was not practical. Therefore a single harvest date was chosen based on a time when the majority of plots were ready.

Percent heading was taken as a visual rating based on the non-herbicide treated checks, which were both 100% headed at 107 DAT (Table 1). The only rice that received an insecticide seed treatment and had delayed heading was the 1.0 oz/A Newpath treatment which reduced heading about 40% compared to the check. All plots that received the insecticide thiamethoxam in the seed treatment resulted in 95-100% heading at the time evaluated. Newpath generally delayed heading or prevented heading to a more severe degree than glyphosate on untreated seed plants. Newpath at 0.25, 0.5, and 1.0 oz/A resulted in 20, 42, and 52% reductions in rice heading, respectively, at 107 DAT on untreated seed. At 90 DAT, delayed heading was observed as compared to the check at high application rates of Roundup and at all application rates of Newpath. At 0.5 and 0.25 fl oz/A Newpath the insecticide treated plants had much higher percentage heading as compared to the untreated. See FIGS. 7 and 8.

At harvest, in addition to grain yield, percent moisture was determined for each treatment. There was a tremendous amount of variation among the herbicide treated plots which resulted in few statistical differences. The non-herbicide treated checks were 22% grain moisture at harvest. With an LSD of 8% moisture, few of the treatment differences were significant. Results like these can be common when dealing with rates of herbicides applied far below the labeled rates (Davis et al., 2011; Hensley et al., 2012). In 2014, harvest and maturity were more uniform than in 2013.

Due to a significant interaction between years the yield results are presented by year in Table 1. In 2013, grain yield of rice ranged from 17 to 170 bushels (bu)/A with an LSD (0.05) of 25 bushels/A for this experiment. Non-treated rice seed plots with no herbicide yielded 147 bu/A while the insecticide treated control yielded 169 bu/A. When Newpath herbicide was applied at either 0.25 or 0.5 oz/A to plots treated with thiamethoxam resulting yields were 100 bu/A higher for the treated seed plots versus the untreated or fungicide only plots. However, at the 1.0 oz/A rate even the treated plots resulted in only 45 bu/A compared to 17 bu/A for the untreated plots. This data suggests that there is a limit to thiamethoxam's ability to "safen" rice to Newpath. FIG. 9.

All insecticide-treated plots yielded higher than the untreated plots when exposed to Roundup in 2013. This difference was most pronounced at the 4.0 oz/A rate of Roundup where yield was improved by over 60 bushels by the addition of a seed treatment that included thiamethoxam. FIG. 10.

No major differences in yield were observed in 2014 (Table 1). However rice grown from non-treated seed yielded 194 bu/A when Newpath was applied at 1.0 fl oz/A and 197 bu/A when 0.5 fl oz of Newpath was applied. The treated seed check yielded significantly higher at 231 bu/A.

The ability of a seed treatment to enable young rice plants to better tolerate off-target drift of both Newpath and Roundup could significantly reduce the number of complaint investigations requested by growers. The resulting higher yields as rice injury is reduced are a benefit to growers.

At one of two locations in 2015, an insecticide seed treatment safened the ability Clearfield hybrid rice to tolerate applications of ALS herbicides. Injury to Clearfield hybrid rice often results following applications of ALS herbicides; thus, the safening effect of the seed treatment would be a novel benefit. Additionally, the possibility exists that crops may better tolerate ALS herbicides under cool, wet conditions especially with reduced seeding rates. With half of the rice grown in Arkansas planted to Clearfield cultivars, this research could make it more plausible and less troublesome to applicator's and growers when these cultivars are planted in close proximity to those lacking the technology.

Example 2: Other Insecticides can Increase Rice Tolerance to Herbicides

This experiment was conducted at the UAPB Research Station, near Lonoke Ark. and the RREC, near Stuttgart, Ark. during the summer of 2014. Both locations were planted with conventional rice (i.e., Roy J) with the RREC location being planted on April 23 and the UAPB location being planted on May 20. Both locations were planted with a cone-drill calibrated to a seeding rate of 75 lb/acre on rows spaced 7.5 inch.

The study was organized using a randomized complete block design with four replications and two factors. Factor A, insecticide seed treatment, consisted of CruiserMaxx Rice (7 oz/cwt), NipSit Inside (1.92 oz/cwt), Dermacor X-100 (2.5 oz/cwt), and a nontreated (fungicide only) check. Factor B, simulated herbicide drift, consisted of Newpath (0.6 fl oz/A), Roundup PowerMax (2.2 fl oz/A) and a nontreated check.

The herbicide treatments were applied at the 2- to 3-leaf (lf) growth stage of the rice at 15 gal/A. The plots were kept weed free with Command and Facet at planting and followed University of Arkansas Cooperative Extension Service (UofA) recommendations as needed throughout the season. The rice was fertilized according to the UofA recommendations for soil fertility.

Data collection included stand counts, injury estimates, canopy height, rice water weevil counts, percent rice heading, and rough rice grain yield. Data were analyzed using JMP Pro 11 and Fisher's protected LSD was used to separate means at the 0.05 level.

RREC. There was a significant interaction between the seed treatment and herbicide factors. The first injury ratings were taken 11 days after treatment (DAT) and injury symptoms were evident for both the Roundup and Newpath treatments, ranging from 8 to 19% injury (Table 2). By 21 DAT, injury had substantially increased from the previous rating for both Newpath and Roundup simulated drift. Rice injury from Roundup and Newpath drift at 21 DAT averaged 39 and 50%, respectively, in plots not treated with an insecticide seed treatment. Rice injury following Roundup drift at 21 DAT was only 19% in plots having a NipSit Inside seed treatment, whereas both NipSit Inside and CruiserMax significantly reduced rice injury caused by Newpath drift.

TABLE 2

Effect of Newpath and Roundup drift rates on Roy J rice with either CruiserMaxx Rice, NipSit Inside, Dermacor X-100 or no insecticide seed treatment grown at the near Stuttgart, Arkansas in 2014.

| Treatment | Injury % 11 DAT[a] | Injury % 21 DAT | Injury % 26 DAT | Injury % 40 DAT | Canopy Cm 82 DAT | Groundcover % 40 DAT | Heading % 97 DAT | Yield Bu/A 147 DAT | Relative Yield % |
|---|---|---|---|---|---|---|---|---|---|
| CruiserMaxx No Herbicide | 0 | 0 | 0 | 0 | 86 | 48 | 81 | 137 | 100 |
| NipSit No Herbicide | 0 | 0 | 0 | 0 | 88 | 51 | 85 | 144 | 105 |
| Dermacor No Herbicide | 0 | 0 | 0 | 0 | 86 | 35 | 74 | 135 | 99 |
| No Seed Trt[b] No Herbicide | 0 | 0 | 0 | 0 | 83 | 40 | 61 | 137 | 100 |
| CruiserMaxx Roundup | 13 | 29 | 34 | 38 | 87 | 24 | 54 | 136 | 99 |
| NipSit Roundup | 11 | 19 | 44 | 46 | 87 | 35 | 65 | 129 | 94 |
| Dermacor Roundup | 8 | 30 | 33 | 55 | 82 | 16 | 33 | 120 | 88 |
| No Seed Trt Roundup | 19 | 39 | 50 | 71 | 74 | 8 | 15 | 92 | 67 |
| CruiserMaxx Newpath | 8 | 34 | 43 | 51 | 83 | 27 | 56 | 125 | 91 |
| NipSit Newpath | 17 | 30 | 55 | 70 | 80 | 25 | 39 | 86 | 63 |
| Dermacor Newpath | 14 | 65 | 66 | 94 | 78 | 3 | 21 | 71 | 52 |
| No Seed Trt Newpath | 16 | 50 | 70 | 90 | 67 | 3 | 24 | 54 | 39 |
| LSD (0.05) | 8 | 13 | 15 | 15 | 8 | 25 | 22 | 28 | — |

[a]DAT = days after treatment.
[b]Trt = treatment.

Rice grown from nontreated seed had 50% injury by 26 DAT, with Dermacor and CruiserMaxx Rice treated plots having significantly less injury (Table 2). Injury to Newpath treated rice continued to increase, with an estimated 70% injury observed on plants grown from nontreated seed. Protection from Newpath drift at 26 DAT was evident for seed treated with NipSit Inside or CruiserMaxx Rice. By 40 DAT, all insecticide seed treatments provided some safening to Roundup drift; albeit, CruiserMaxx Rice was superior to Dermacor but not NipSit Inside. In regards to rice injury from Newpath at 40 DAT, only CruiserMaxx Rice and NipSit Inside provided some safening.

All treatments that received an insecticide seed treatment and Newpath drift had significantly greater canopy heights at 82 DAT compared to rice grown from the non-treated seed that received Newpath drift (Table 2). The treatments that received either a NipSit Inside or CruiserMaxx Rice seed treatment, with Roundup drift, had a significantly taller canopy (>10 cm) than the rice grown from the nontreated seed that received Roundup drift. All treatments that received an insecticide seed treatment and Newpath or Roundup drift had similar canopy heights as the nontreated seed with no herbicide drift.

Percent heading was taken 97 DAT to determine if the drift events delayed heading in the rice. All treatments that received an insecticide seed treatment and no herbicide drift event was 74 to 85% headed at the time of evaluation (Table 2). The rice grown from the nontreated seed that had Roundup drift was only 15% headed, which was comparable to Dermacor treatment that received Roundup drift. The rice UAPB. Significant injury to the rice plants was visible from Newpath and Roundup drift by 11 DAT (Table 3). Overall, the Roundup drift caused more rice injury than the Newpath drift at this point. The rice grown from the nontreated and the Dermacor seed treatment were injured significantly more than the other treatments with Roundup drift. For the treatments that received Newpath drift, the CruiserMaxx Rice treated seed had the least injury (19%) while none of the other treatments were different from each other with injury ranging from 30 to 35%.

TABLE 3

Effect of Newpath and Roundup drift rates on Roy J rice with either CruiserMaxx Rice, NipSit Inside, Dermacor X-100 or no insecticide seed treatment grown near Lonoke, Arkansas in 2014.

| Treatment | Injury % 11 DAT[a] | Injury % 21 DAT | Injury % 26 DAT | Injury % 40 DAT | Canopy Cm 82 DAT | Groundcover % 40 DAT | Heading % 90 DAT | Yield Bu/A 106 DAT | Relative Yield % |
|---|---|---|---|---|---|---|---|---|---|
| CruiserMaxx No Herbicide | 0 | 0 | 0 | 0 | 83 | 58 | 88 | 202 | 104 |
| NipSit No Herbicide | 0 | 0 | 0 | 0 | 78 | 47 | 83 | 201 | 104 |
| Dermacor No Herbicide | 0 | 0 | 0 | 0 | 75 | 37 | 79 | 194 | 100 |
| No Seed Trt[b] No Herbicide | 0 | 0 | 0 | 0 | 78 | 36 | 76 | 194 | 100 |
| CruiserMaxx Roundup | 26 | 20 | 10 | 7 | 78 | 37 | 79 | 197 | 102 |
| NipSit Roundup | 36 | 32 | 13 | 7 | 77 | 35 | 78 | 195 | 101 |
| Dermacor Roundup | 46 | 41 | 25 | 18 | 71 | 19 | 51 | 170 | 88 |
| No Seed Trt Roundup | 49 | 51 | 29 | 19 | 71 | 19 | 43 | 165 | 85 |
| CruiserMaxx Newpath | 19 | 15 | 4 | 3 | 76 | 36 | 85 | 187 | 96 |
| NipSit Newpath | 30 | 24 | 9 | 5 | 76 | 37 | 86 | 199 | 103 |
| Dermacor Newpath | 35 | 31 | 14 | 8 | 73 | 26 | 59 | 185 | 95 |
| No Seed Trt Newpath | 35 | 33 | 13 | 5 | 80 | 37 | 73 | 197 | 102 |
| LSD (0.05) | 7 | 8 | 9 | 10 | 7 | 15 | 17 | 18 | — |

[a]DAT = days after treatment.

grown from the nontreated seed that had Newpath drift was 24% headed at the time of evaluation, which was not different from the corresponding Dermacor and NipSit Inside treatments. Results from this experiment indicate CruiserMaxx Rice minimizes the risk for delayed heading following Newpath drift, and CruiserMaxx Rice and NipSit Inside protects rice against delayed heading following Roundup drift.

Rice yield and grain moisture were taken 147 DAT and converted to a standard yield with a standard moisture of 12% (Table 2). The overall yield was influenced by the injury sustained throughout the season, as indicated by the injury ratings. Yield of plants with Newpath drift were affected more than plants with Roundup drift, with the exception being the Cruiser Maxx Rice treated seed where yields were not different between the two herbicides. Rice grown from the nontreated seed that received Roundup drift yielded 92 bu/A while rice grown from both the CruiserMaxx Rice and NipSit Inside treated seed yielded significantly higher with 136 and 129 bu/A, respectively. The lowest yielding treatments with Newpath drift were the Dermacor and nontreated seed with yields of 71 and 54 bu/A, respectively. Overall, CruiserMaxx Rice protected the yield of the rice from Newpath drift, and all three seed treatments protected the yield similarly from Roundup drift.

By 26 DAT, the least amount of rice injury from Roundup drift was when the rice seed was treated with either CruiserMaxx Rice or Nip Sit Inside (Table 3). Injury from Newpath drift at 26 DAT was less when the seed was treated with CruiserMaxx Rice compared to Dermacor and no seed treatment and not significantly different when compared to NipSit Inside. Dermacor and NipSit Inside provided no significant protection of the rice plants from Newpath injury by 26 DAT than when the seed was not treated.

Canopy heights were not a good indicator of differences in the safening potential among the insecticide seed treatments (Table 3). Heading was delayed for rice not having an insecticide seed treatment or when treated with Dermacor relative to rice seed treated with CruiserMaxx Rice or Nip Sit Inside. CruiserMaxx Rice and NipSit Inside seed treatments protected rice against significant yield loss following Roundup drift. No significant yield loss was observed following Newpath drift, regardless of whether the seed was treated with an insecticide or not.

The added benefits of insecticide seed treatments to young rice plants in protecting against rice water weevil and Grape colaspis is undeniable. However, the ability of some of these insecticide seed treatments to reduce injury from herbicide drift could add more return for the money spent on these seed treatments. The ability of the CruiserMaxx Rice seed treatment to help the rice achieve at least 90% relative yield in the presence of both Roundup and Newpath drift could help farmers overcome drift events without relying on insurance or litigation. In return, insurance companies and the state could save money on the reduction in the number of drift complaints reported each year to the Arkansas State Plant Board. In addition, this could also allow conventional rice to be planted in closer proximity to Clearfield rice and Roundup Ready soybean.

Example 3: Effect of Soybean Seed Insecticide Treatment on Soybean Tolerance to Herbicides A field experiment was conducted in the summer of 2014 near Newport, Ark. to evaluate the effect of a soybean insecticide seed treatment, Cruiser Maxx, on herbicide injury to convention soybean. The conventional soybean variety Ozark was planted on 7-17-14 in plots measuring 7.5×20 feet in size. In each plot, half the drill rows were treated with Cruiser Maxx at 7 oz/cwt, and the other half were treated with only the fungicide portion of that treatment. Seeding rate was 125,000 seeds per acre. Seed were planted to a depth of 0.5 inches. Soil temperature at the time of planting and application of the PRE treatments was 62 degrees F.

Herbicide treatments consisted of metribuzin (0.671 lb/A), Dual Magnum (2.0 pints/A), Zidua (3.5 oz/A), and Valor applied alone at 2.0 oz/A or in a tank mix with Zidua and Dual Magnum applied PRE. Post emerge treatments included Roundup PowerMax (2 and 4 oz/A), Liberty (2 and 4 oz/A), dicamba (0.25 and 0.5 oz/A), 2,4-D (0.75 and 1.5 oz/A) and Permit at 0.5 and 1.0 oz/A applied at the third trifoliate stage. Herbicides were applied with a 4 nozzle boom calibrated to deliver 15 GPA using $CO_2$ as a propellant.

Plots were visually rated for herbicide injury at 10 days after emergence and at 35 days after application of the POST treatments. The rating scale was 0 to 100 where 0=no injury and 100=complete death or desiccation of the plant. Means were separated using Fisher's protected LSD (0.05).

Residual treatments all injured soybean less than 6 percent when evaluated 10 days after emergence (Table 4). Soybean seed treatment did not appear to have any "safening" effect on these herbicides, which included: metribuzin, Dual, Zidua, Valor, and combinations of Valor with Dual and Zidua, although injury for all these treatments was lower than what is observed from time to time in the field.

TABLE 4

Response of Ozark conventional soybean to various PRE treatments.

| Herbicide | Rate | Soybean Injury (%) at 10 and 35 DAT | | | |
|---|---|---|---|---|---|
| | | 10 DAT | 10 DAT (T)[1] | 35 DAT | 35 DAT (T) |
| Metribuzin | 0.671 lb/A | 0 | 0 | 0 | 0 |
| Dual Magnum | 2.0 pts/A | 0 | 0 | 0 | 0 |
| Zidua | 3.5 oz/A | 4 | 3 | 0 | 0 |
| Valor | 2.0 oz/A | 4 | 4 | 0 | 0 |
| Zidua + Valor | 3.5 + 2.0 oz/A | 6 | 6 | 0 | 0 |
| Dual + Valor | 2.0 pt + 2.0 oz/A | 3 | 3 | 0 | 0 |
| LSD (P = 0.05) | — | | NSD | | NSD |

[1]Abbrevieations used: (T) = Treated soybean.

Of all the post herbicides evaluated only slightly less injury was observed on treated versus untreated soybean when a low rate of Liberty herbicide was applied. Injury from 4 oz. of Liberty was reduced from 45 to 30% and from 30 to 15% with 2 oz. of Liberty per acre (Table 5). Post injury ranged from 0 to 80% from herbicides including: Roundup, Permit, Liberty, dicamba, and 2,4-D at two low rates each. There were no differences in rates applied POST for each herbicide with the exception of the Liberty treatments. Although injury from some treatments lingered for the rest of the season no other differences were observed at later timings. This trail was not taken to yield and at no time was any actual injury observed from insects.

TABLE 5

Response of Ozark conventional soybean to various POST treatments applied at third trifoliate and averaged across two rates, except for the Liberty treatments.

| Herbicide | Soybean Injury (%) at 10 and 35 DAT | | | |
|---|---|---|---|---|
| | 10 DAT | 10 DAT (T)[1] | 35 DAT | 35 DAT (T) |
| Liberty 4 oz/A | 45 | 15 | 3 | 2 |
| Liberty 2 oz/A | 30 | 15 | 3 | 2 |
| Roundup | 15 | 15 | 5 | 5 |
| Dicamba | 60 | 60 | 30 | 30 |
| 2,4-D | 15 | 15 | 5 | 5 |
| Permit | 70 | 70 | 40 | 40 |
| LSD (P = 0.05) | 14 | | NSD | |

[1]Abbrevieations used: (T) = Treated soybean.

In rice, seed insecticide treatments have been proven to reduce the effects of drift of certain herbicides and hasten recovery time to injury. This effect while not 100% effective does make management of drift and herbicide injury easier in some situations. This soybean trial will be repeated in 2015. It is worth noting that only after a number of trials were conducted in rice did the advantages to a rice seed insecticide treatment fully come to light. Since very little pre-emerge injury was observed to begin with an effort will be made to increase injury from Pre applied herbicides next year. Although little "safening" effect was observed with the post treatments, the fact that Liberty was less injurious to treated soybean will be further investigated.

Example 4: Evaluation of Insecticide Treatment in Clearfield Hybrid Rice to Reduce Herbicide Injury Increased use of insecticide seed treatments in rice have brought up many questions about the potential benefits of these products. In 2014 and 2015, a field experiment was conducted at the Rice Research and Extension Center in Stuttgart, Ark. and at the University of Arkansas Pine Bluff Farm in Lonoke, Ark. to evaluate whether an insecticide seed treatment could possibly lessen injury from acetolactate synthase (ALS)-inhibiting herbicides in Clearfield rice. There are multiple reports each year of injury to Clearfield rice from ALS-inhibiting herbicides. This study was under-taken to determine the effectiveness of insecticide seed treatments to reduce injury in Clearfield rice from ALS-inhibiting herbicide application.

Two varieties of Clearfield rice were tested (CLXL745 and CL152) with and without an insecticide seed treatment (CruiserMaxx® Rice). Four different herbicide combinations were evaluated (a non-treated check, two applications of Regiment® (bispyribac), two applications of Newpath® (imazethapyr), and two applications of Newpath® plus Regiment®). The first herbicide application was early post-emergence (1- to 2-leaf rice) and the second application was prior to establishing the permanent flood (preflood). Crop injury was assessed at 2, 4, and 6 weeks after final herbicide application (2, 4, and 6 weeks after treatment (WAT). Stand counts and plant heights were taken at the time of the first application for comparisons. Rough grain yields were determined and adjusted to 12% moisture. The data was analyzed using JMP Pro 11 and significant means separated using Fisher's protected LSD (0.05). Site years (four) were considered as random effect. The data collection included ratings of the injury, Groundcover (using SigmaScan® Pro), stand counts, Percent heading and grain yield.

At 2WAT and 4WAT, the seeds treated with insecticide showed significantly less damage in both varieties after the combined herbicide treatment as compared to untreated seeds as shown in FIG. 11. The variability between the two varieties tested is shown in FIG. 12. At 6 WAT, the rice treated with CruiserMaxx Rice and with two applications of Newpath plus Regiment showed less injury than the rice treated with the fungicide-only seed treatment with the same herbicide program as shown in FIG. 13. Overall, CLXL745 rice showed less tolerance to ALS-inhibiting herbicides than CL152. Even with this severe level of injury, the rice plants recovered by the end of the growing season and yields within a variety were similar with and without a seed treatment across all herbicide treatments during the growing season tested. Rough rice yields averaged over seed treatments and herbicides were 160 bu/A for CL152 and 225 bu/A for CLXL745. These results show that repeated applications of ALS-inhibiting herbicides can cause severe injury to Clearfield® rice, especially CLXL745, but rice is able to recover from this injury without a statistically significant adverse effect on yield.

REFERENCES

Culpepper, A. S., A. C. York, J. L. Marth, and F. T. Corbin. 2001. Effect of insecticides on clomazone absorption, translocation, and metabolism in cotton. Weed Sci. 49:613-616.

Davis, B. M., R. C. Scott, J. K. Norsworthy, and E. Gbur. 2011. Response of rice to low rates of glyphosate and glufosinate. Weed Technol. 25:198-204.

Dickson, J. W., R. C. Scott, and B. M. Davis. 2014. Response of the Conventional Rice Varieties Roy J and Wells to Low Soil Concentrations of Imazethapyr B. R. Wells Rice Research Studies. 2013:206.

Hardke, J. T. and Wilson C. E. 2012. Trends in Arkansas rice production. B. R. Wells Rice Research Studies. 2011. pp. 38-47.

Hensley, J. B., E. P. Webster, D. C. Blouin, D. L. Harrell, and J. A. Bond. 2012. Impact of drift rates of imazethapyr and low carrier volume on non-Clearfield Rice. Weed Technol. Vol. 26:236-242.

Plummer, W. A., G. M. Lorenz, N. M. Taillon, B. C. Thrash, J. W. Fortner, and C. K. Colwell. 2012. Impact of insecticide seed treatments in large block field trials in Arkansas 2009-2011. B. R. Wells Rice Research Studies 2011. pp. 128-132.

Wilf, H., G. Lorenz, III, K. Colwell, and N. Taillon. 2010. Comparing the efficacy of insecticide seed treatments at three seeding rates. B. R. Wels Rice Research Studies 2009. Pp 104-109.

Wilson, C. E., S. K. Runsick, and R. Mazzanti. 2010. Trends in Arkansas rice production. B. R. Wells Rice Research Studies 2009. pp. 11-21.

York, A. C. and D. L. Jordan. 1992. Cotton response to clomazone and insecticide combinations. Weed Technol. 6:796-800.

York, A. C., D. L. Jordan, and R. E. Frans. 1991. Insecticides modify cotton (*Gossypium hirsutum*) response to clomazone. Weed Technol. 5:729-735.

We claim:

1. A method of increasing the tolerance of a rice plant to an herbicide comprising treating seeds of the rice plant with a composition consisting essentially of an insecticide prior to planting, wherein the plant does not have complete natural or engineered resistance to the herbicide, planting the seeds in a field and applying the herbicide post-emergence to the plants derived from the treated seeds, wherein the plants growing from the seeds have increased tolerance to the herbicide as compared to plants grown from seeds not treated with the insecticide, wherein the herbicide is glyphosate, and wherein the insecticide is thiamethoxam, clothianidin, or chlorantraniliprole.

2. The method of claim 1, wherein the rice is a hybrid rice with incomplete tolerance to the herbicide.

3. The method of claim 1, wherein the increased tolerance is measured as increased growth, decreased damage to or delay in growth of the treated plant, increased production compared to control plants whose seeds are not treated with the insecticide.

4. The method of claim 1, further comprising exposing the plant to a second herbicide to which the plant is resistant.

5. The method of claim 4, wherein the second herbicide and the first herbicide are not the same class of herbicide.

6. The method of claim 1, wherein the insecticide is thiamethoxam.

7. The method of claim 1, wherein the insecticide is clothianidin.

8. The method of claim 1, wherein the insecticide is chlorantraniliprole.

* * * * *